G. W. SHARPE.
TIRE.
APPLICATION FILED MAY 14, 1908. RENEWED AUG. 27, 1909.
935,613.
Patented Sept. 28, 1909.
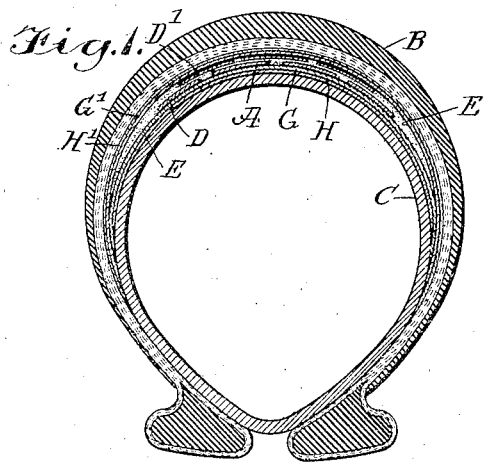
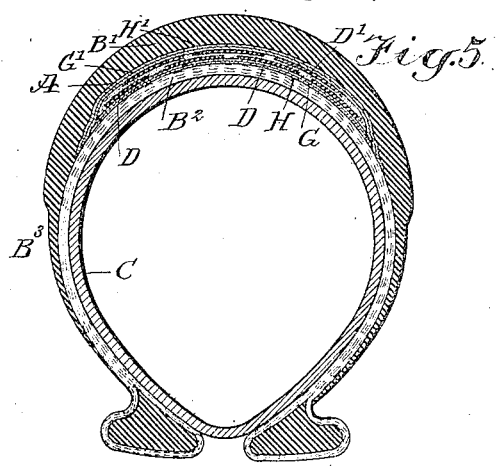
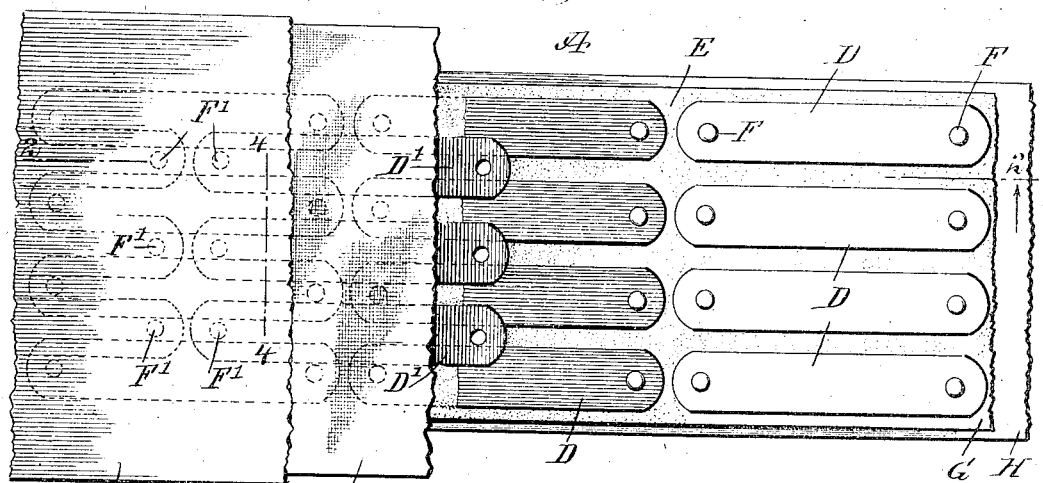
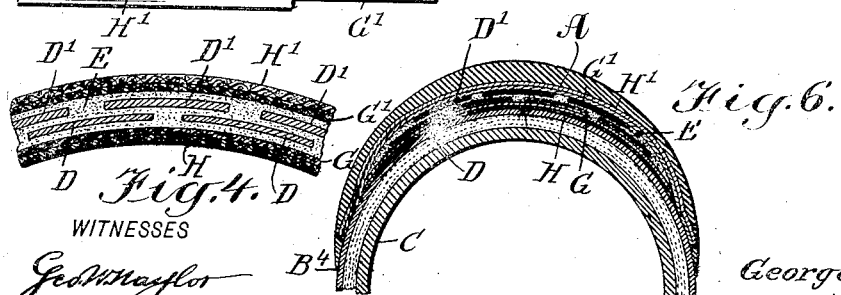
WITNESSES
INVENTOR
George W. Sharpe
BY
ATTORNEYS

UNITED STATES PATENT OFFICE.

GEORGE WILLIAM SHARPE, OF NEW YORK, N. Y.

TIRE.

935,613.     Specification of Letters Patent.     Patented Sept. 28, 1909.

Application filed May 14, 1908, Serial No. 432,854. Renewed August 27, 1909. Serial No. 514,900.

*To all whom it may concern:*

Be it known that I, GEORGE WILLIAM SHARPE, a citizen of the United States, and a resident of the city of New York, borough of Brooklyn, in the county of Kings and State of New York, have invented a new and Improved Tire, of which the following is a full, clear, and exact description.

The object of the invention is to provide a new and improved tire for use on automobiles and other vehicles, and arranged to render the tire exceedingly strong, durable, puncture proof and flexible, and to prevent blow-outs or bursting of the tire.

My tire is rendered puncture-proof by virtue of overlapping short strips of steel or other sheet armor material embedded in the rubber or other material forming the shoe or protecting jacket of the tube. As distinguished from the so-called "fish-scale" structures of the prior art, the overlapping protecting strips in my tire are not in contact and cannot rub on one another, and thereby generate heat within the tire. The strips in my tire are furthermore securely anchored or held in place by rivets at either end. In the prior art, where short strips of this character have been employed they have been held at one end only, and then not by individual retaining means, such as rivets, but by wires on which several of the strips have been threaded or strung. Such wires having not the strength necessary to resist the tendency of the strips to creep, and, under the strains to which the wires are subjected, they either tear the fabric or themselves break, in which latter event all the strips attached to a wire are loosened by a single break therein. Furthermore, the wire chafes and wears out the fabric in contact therewith by rubbing over the surface of the same. More often the fish scales have not been held by any means other than the rubber in which they have been embedded. In general the objections to the so-called fish-scale structures have been that the scales creep over each other, leaving unprotected spots on the tire and, by finally bunching on top of one another, cause a break in the tube. In creeping over and rubbing on one another a degree of heat is generated in the tire not uncommonly sufficient to cause a blow-out in the tube. The ordinary disk fish-scale structures add nothing to the resiliency of the tire, but, on the contrary, stiffen it perceptibly. In my structure the resiliency of the tire is greatly increased by the protecting strips and these strips will maintain the tire resilient after the life of the rubber is gone.

The invention consists of other novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a cross section of the improvement, showing the reinforcing member interposed between the shoe and the inner tube; Fig. 2 is a longitudinal section of the reinforcing member of the tire on the line 2—2 of Fig. 3; Fig. 3 is a plan view of the reinforcing member flattened out and parts broken out to show the successive layers; Fig. 4 is an enlarged cross section of the same on the line 4—4 of Fig. 3; Fig. 5 is a cross section of the improvement showing the reinforcing member interposed between the tread and the inner layer of canvas of the shoe; and Fig. 6 is a cross section of the improvement showing the reinforcing member in place of the tread in case the latter has worn away.

In the tire shown in Fig. 1, the reinforcing member A is interposed between the usual outer shoe B and the inner inflatable tube C, and, as illustrated in Fig. 5, the reinforcing member A is interposed between the tread $B'$ and the inner canvas $B^2$ of the shoe $B^3$, and, as shown in Fig. 6, the reinforcing member A is strapped or otherwise secured to the outer shoe $B^4$ in place of the usual tread, in case such tread has worn off.

Although I have shown and described the preferred applications of the reinforcing member A on the tire, it is evident that I do not limit myself to such applications, as the reinforcing member A may be used in other ways, but in each case the construction of the reinforcing member is practically the same.

The reinforcing member A, as shown in detail in Figs. 2, 3 and 4, is formed of two layers of metallic plates or strips D, D', each plate or strip being made of thin steel, preferably copper plated, but plates or strips of copper or other material may be used. The plates or strips D and D' are arranged lengthwise in the direction of the periphery of the tire, and the layers of plates or strips D and D' overlap transversely and lengthwise, as plainly indicated in Fig. 3. The layers of plates or strips D, D' are separated from each other by a fabric material E, preferably rubber, in which the plates or strips are embedded, as plainly indicated in Fig. 4, and the ends of the plates or strips D and D' are fastened by rivets F and F' to sheets G, G' of canvas or other fabric material, and the sheets G and G' are covered by sheets H, H' of canvas or other fabric material, and the several sheets are cemented, glued or otherwise fastened together, to complete the reinforcing member.

By reference to Fig. 3, it will be seen that each layer of plates or strips D, D' consists of sets of plates, each set being formed of a number of plates spaced apart in a transverse direction, and successive sets being spaced apart at their ends, to render the reinforcing member exceedingly flexible in a transverse as well as in a lengthwise direction, thus rendering the tire exceedingly strong, durable and flexible, at the same time making the tire puncture-proof and preventing blow-outs or bursting of the tire.

As shown in the drawings, it is preferred to use four plates D in each set for the innermost layer of plates and three plates D' in each set for the outermost layer of plates, but the number of plates in each set may be varied and the plates may be made narrower or wider or longer or shorter than indicated in Fig. 3.

By riveting each plate D or D' at both ends to the corresponding sheet G or G', it is evident that the plates are firmly held in place and hence are not liable to creep either in a lengthwise or in a transverse direction.

By having the plates overlapping in both a transverse and lengthwise direction, it is evident that the tire is rendered puncture-proof.

Having thus described my invention, I claim as new and desire to secure by Letters Patent:

1. A protective member for tires consisting of tough flexible material having attached thereto a plurality of layers of short elongated strips of armor material, the strips of each layer being slightly spaced from the adjacent strips of the same layer, and a body of flexible material interposed between the successive layers of strips to prevent contact of the strips of one layer with the strips of another layer, the strips of the one layer overlapping and being staggered with respect to the strips of the next layer, so that the spaces between strips in one layer are covered by the strips of another layer, said strips being so disposed in the protective member as to extend lengthwise of the periphery of the tire when the protective member is applied to the tire.

2. A protective member for tires consisting of tough flexible material having attached thereto a plurality of layers of short elongated strips of armor material, the strips of each layer being slightly spaced from the adjacent strips of the same layer, and the strips of the one layer overlapping and being staggered with respect to the strips of the next layer so that the spaces between the strips of one layer are covered by the strips of another layer, said strips being so disposed in the protective member as to extend lengthwise of the periphery of the tire when the protective member is applied to the tire, and rivets securing said strips at both ends thereof to the flexible material by which they are carried.

3. A protective member for tires consisting of tough flexible material carrying a plurality of layers of short elongated strips of resilient armor material, each of said strips being riveted at both ends to the material by which they are carried, the strips of each layer being slightly spaced from the adjacent strips of the same layer, and a body of flexible material interposed between the successive layers of strips to prevent contact of the strips of one layer with the strips of another layer, the strips of one layer overlapping and being staggered with respect to the strips of the next layer so that the spaces between the strips in one layer are covered by the strips of another layer, said strips being so disposed in the protective member as to extend lengthwise of the periphery of the tire when the protective member is applied to the tire.

4. A protective member for tires consisting of tough flexible material carrying a plurality of layers of short elongated strips of resilient armor material, each of said strips being riveted at both ends to the material by which the same is carried, the strips of each layer being slightly spaced from the adjacent strips of the same layer, and a body of vulcanized rubber interposed between the successive layers of strips to prevent contact of the strips of one layer with the strips of another layer, the strips of one layer overlapping and being staggered with respect to the strips of the next layer so that the spaces between the strips of one layer are covered by the strips of another layer, said strips being so disposed in the protective member as to extend lengthwise of the periphery of the tire when the protective member is applied to the tire.

In testimony whereof I have signed my name to this specification in the presence of two subscribing witnesses.

GEORGE WILLIAM SHARPE.

Witnesses:
THEO. G. HOSTER,
JOHN P. DAVIS.